US012804541B2

(12) United States Patent
Khlass et al.

(10) Patent No.: US 12,804,541 B2
(45) Date of Patent: Nov. 17, 2026

(54) UE MOBILITY HANDLING IN THE PRESENCE OF NES CELLS

(71) Applicant: Nokia Technologies Oy, Espoo (FI)

(72) Inventors: Ahlem Khlass, Massy (FR); Mads Lauridsen, Aalborg (DK); Daniela Laselva, Aalborg (DK); Gagandeep Bhatti, Dallas, TX (US)

(73) Assignee: Nokia Technologies Oy, Espoo (FI)

( * ) Notice: Subject to any disclaimer, the term of this patent is extended or adjusted under 35 U.S.C. 154(b) by 285 days.

(21) Appl. No.: 18/443,478

(22) Filed: Feb. 16, 2024

(65) Prior Publication Data

US 2024/0284323 A1 Aug. 22, 2024

Related U.S. Application Data

(60) Provisional application No. 63/447,156, filed on Feb. 21, 2023.

(51) Int. Cl.
*H04W 52/02* (2009.01)
*H04B 17/318* (2015.01)
*H04W 24/10* (2009.01)
*H04W 56/00* (2009.01)

(52) U.S. Cl.
CPC ...... *H04W 52/0206* (2013.01); *H04B 17/328* (2023.05); *H04W 24/10* (2013.01); *H04W 56/0015* (2013.01)

(58) Field of Classification Search
CPC ............. H04W 52/0206; H04W 24/10; H04W 36/0083; H04W 56/0015
USPC ........................................................ 370/318
See application file for complete search history.

(56) References Cited

U.S. PATENT DOCUMENTS

2016/0242112 A1* 8/2016 Gao ...................... H04W 72/20
2020/0213887 A1* 7/2020 Chen ...................... H04W 88/06
2023/0389120 A1* 11/2023 Babaei .............. H04W 52/0235
2024/0107441 A1* 3/2024 Park ....................... H04W 76/20
2025/0106756 A1* 3/2025 Kim ...................... H04W 52/02
2025/0380212 A1* 12/2025 Han .................. H04W 52/0206
2025/0392973 A1* 12/2025 Teyeb .................. H04W 36/22

OTHER PUBLICATIONS

"3rd Generation Partnership Project; Technical Specification Group Radio Access Network; NR; Radio Resource Control (RRC) protocol specification (Release 17)", 3GPP TS 38.331, V17.3.0, Dec. 2022, pp. 1-1318.
"3rd Generation Partnership Project; Technical Specification Group Radio Access Network; NR; NR and NG-RAN Overall Description; Stage 2 (Release 17)", 3GPP TS 38.300, V17.3.0, Dec. 2022, pp. 1-210.

(Continued)

*Primary Examiner* — Chi Tang P Cheng
*Assistant Examiner* — Michael Wayne Maddox
(74) *Attorney, Agent, or Firm* — Robert P. Michal, Esq.; Rimon PC

(57) ABSTRACT

A method including determining, with a user equipment, to use a measurement and reporting configuration based, at least partially, upon a network energy saving state of a target cell; measuring, with the user equipment, with use of the measurement and reporting configuration; and determining, with the user equipment, to transmit a measurement report based upon the determined measurement and reporting configuration.

2 Claims, 5 Drawing Sheets

(56) References Cited

OTHER PUBLICATIONS

"3rd Generation Partnership Project; Technical Specification Group Radio Access Network; NR; User Equipment (UE) procedures in Idle mode and RRC Inactive state (Release 17)", 3GPP TS 38.304, V17.3.0, Dec. 2022, pp. 1-51.
"New SI: Study on network energy savings for NR", 3GPP TSG RAN Meeting #94e, RP-213554, Agenda: 8A.1, Huawei, Dec. 6-17, 2021, 5 pages.
"3rd Generation Partnership Project; Technical Specification Group Radio Access Network; Study on network energy savings for NR (Release 18)", 3GPP TR 38.864, V18.0.0, Dec. 2022, pp. 1-71.
"New WID: Network energy savings for NR", 3GPP TSG RAN Meeting #98-e, RP-223540, Agenda: 9.1.1, Huawei, Dec. 12-16, 2022, pp. 1-6.
"3rd Generation Partnership Project; Technical Specification Group Radio Access Network; NR; Physical layer measurements (Release 17)", 3GPP TS 38.215, V17.2.0, Sep. 2022, pp. 1-26.
"[PRE120][304][NES] Summary of Connected Mode Mobility—8.3.5 (Nokia)", 3GPP TSG-RAN WG2 Meeting #120 Electronic, R2-2213703, Agenda: 8.3.5, Nokia, Nov. 14-18, 2022, 10 pages.
"Msc-generator", Sourceforge, Retrieved on Jun. 18, 2024, Webpage available at :https://sourceforge.net/projects/msc-generator/.
Extended European Search Report received for corresponding European Patent Application No. 24153337.1, dated Jul. 17, 2024, 13 pages.
"NES Connected Mode Mobility", 3GPP TSG-RAN WG1 Meeting #120, R2-2211602, Agenda: 8.3.5, Qualcomm Incorporated, Nov. 14-18, 2022, 4 pages.
"Connected Mode Mobility", 3GPP TSG-RAN WG2 Meeting #121, R2-2300542, Agenda: 8.3.5, Qualcomm Incorporated, Feb. 27-Mar. 3, 2023, 4 pages.
"Discussion on CHO enhancements for NES", 3GPP TSG-RAN WG2 Meeting #121, R2-2300940, Agenda: 8.3.5, Sharp, Feb. 27-Mar. 3, 2023, 2 pages.
"Frequency domain NES aspects", 3GPP RAN WG2 Meeting #119-bis-e, R2-2210283, Agenda: 8.3.2, InterDigital, Oct. 10-19, 2022, 7 pages.
"Cell DTX/DRX", 3GPP RAN WG2 Meeting #120, R2-2212324, Agenda: 8.3.2, InterDigital, Nov. 14-19, 2022, 6 pages.
"Supporting multiple power states", 3GPP TSG-RAN WG2 Meeting#119bis-e, R2-2210667, Agenda: 8.3.2, ZTE corporation, Oct. 10-19, 2022, 4 pages.
Office action received for corresponding European Patent Application No. 24153337.1, dated Mar. 17, 2026, 4 pages.

* cited by examiner

UE MOBILITY HANDLING IN THE PRESENCE OF NES CELLS

TECHNICAL FIELD

The example and non-limiting embodiments relate generally to handover and, more particularly, to a cell in a network energy savings state.

BRIEF DESCRIPTION OF PRIOR DEVELOPMENTS

Use of network energy savings (NES) is known in regard to a radio access network (RAN).

SUMMARY OF THE INVENTION

The following summary is merely intended to be an example. The summary is not intended to limit the scope of the claims.

In accordance with one aspect, an example method is provided comprising: determining, with a user equipment, to use a measurement and reporting configuration based, at least partially, upon a network energy saving state of a target cell; measuring, with the user equipment, with use of the measurement and reporting configuration; and determining, with the user equipment, to transmit a measurement report based upon the determined measurement and reporting configuration.

In accordance with another aspect, an example apparatus is provided comprising: at least one processor; and at least one non-transitory memory storing instructions that, when executed with the at least one processor, cause the apparatus to perform: determining, with the apparatus, to use a measurement and reporting configuration based, at least partially, upon a network energy saving state of a target cell; measuring, with the apparatus, with use of the measurement and reporting configuration; and determining, with the apparatus, to transmit a measurement report based upon the determined measurement and reporting configuration.

In accordance with another aspect, an example apparatus is provided comprising: means for determining, with a user equipment, to use a measurement and reporting configuration based, at least partially, upon a network energy saving state of a target cell; means for measuring, with the user equipment, with use of the measurement and reporting configuration; and means for determining, with the user equipment, to transmit a measurement report based upon the determined measurement and reporting configuration.

In accordance with another aspect, an example apparatus is provided comprising: circuitry configured for determining, with a user equipment, to use a measurement and reporting configuration based, at least partially, upon a network energy saving state of a target cell; circuitry configured for measuring, with the user equipment, with use of the measurement and reporting configuration; and circuitry configured for determining, with the user equipment, to transmit a measurement report based upon the determined measurement and reporting configuration.

In accordance with another aspect, an example embodiment is provided with a non-transitory program storage device readable by an apparatus, tangibly embodying a program of instructions executable with the apparatus for performing operations, the operations comprising: determining, with a user equipment, to use a measurement and reporting configuration based, at least partially, upon a network energy saving state of a target cell; measuring, with the user equipment, with use of the measurement and reporting configuration; and determining, with the user equipment, to transmit a measurement report based upon the determined measurement and reporting configuration.

In accordance with another aspect, an example method is provided comprising: sending, with a network node to a user equipment, at least one of: an information for the user equipment to use to determine whether a target cell is in a network energy saving state, or a measurement and reporting configuration that is based at least partially on a network energy saving state of the target cell; and receiving, with the network node, a measurement report based, at least partially, upon at least one of the sent information or the sent measurement and reporting configuration.

In accordance with another aspect, an example apparatus is provided comprising: at least one processor; and at least one non-transitory memory storing instructions that, when executed with the at least one processor, cause the apparatus to perform: sending, with the apparatus to a user equipment, at least one of: an information for the user equipment to use to determine whether a target cell is in a network energy saving state, or a measurement and reporting configuration that is based at least partially on a network energy saving state of the target cell; and receiving, with the apparatus, a measurement report based, at least partially, upon at least one of the sent information or the sent measurement and reporting configuration.

In accordance with another aspect, an example apparatus is provided comprising: means for sending, with the apparatus to a user equipment, at least one of: an information for the user equipment to use to determine whether a target cell is in a network energy saving state, or a measurement and reporting configuration that is based at least partially on a network energy saving state of the target cell; and means for receiving, with the apparatus, a measurement report based, at least partially, upon at least one of the sent information or the sent measurement and reporting configuration.

In accordance with another aspect, an example apparatus is provided comprising: circuitry configured for sending, with the apparatus to a user equipment, at least one of: an information for the user equipment to use to determine whether a target cell is in a network energy saving state, or a measurement and reporting configuration that is based at least partially on a network energy saving state of the target cell; and circuitry configured for receiving, with the apparatus, a measurement report based, at least partially, upon at least one of the sent information or the sent measurement and reporting configuration.

In accordance with another aspect, an example embodiment is provided with a non-transitory program storage device readable by an apparatus, tangibly embodying a program of instructions executable with the apparatus for performing operations, the operations comprising: sending, with a network node to a user equipment, at least one of: an information for the user equipment to use to determine whether a target cell is in a network energy saving state, or a measurement and reporting configuration that is based at least partially on a network energy saving state of the target cell; and receiving, with the network node, a measurement report based, at least partially, upon at least one of the sent information or the sent measurement and reporting configuration.

According to some aspects, there is provided the subject matter of the independent claims. Some further aspects are provided in subject matter of the dependent claims.

BRIEF DESCRIPTION OF DRAWINGS

The foregoing aspects and other features are explained in the following description, taken in connection with the accompanying drawings, wherein.

DETAILED DESCRIPTION

Figure 1:
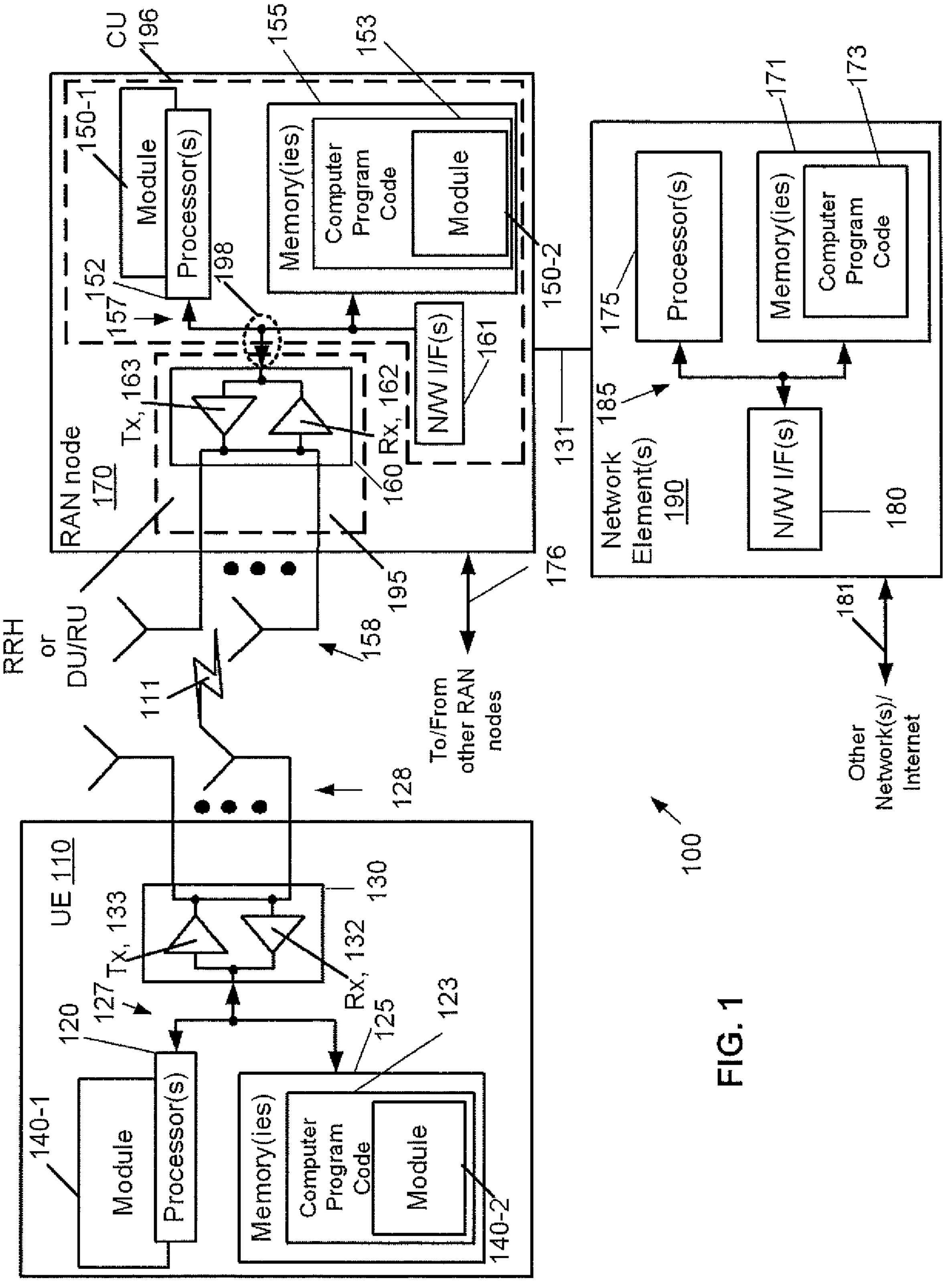
FIG. 1 is a block diagram of one possible and non-limiting example system in which the example embodiments may be practiced.

The following abbreviations that may be found in the specification and/or the drawing figures are defined as follows:

3GPP third generation partnership project
5G fifth generation
5GC 5G core network
A-MPR additional MPR
AMF access and mobility management function
CE UE coverage enhanced UE
CHO conditional handover
CP-OFDM cyclic prefix OFDM
CSI-RS channel state information reference signals
CU central unit
DCI downlink control information
DCI Format 0_1 UL grant configurable by RRC
DFT-s-OFDM discrete Fourier transform spread orthogonal frequency division multiplexing
DRS discovery reference signal
DU distributed unit
DWS dynamic waveform switching
eNB (or eNodeB) evolved Node B (e.g., an LTE base station)
EN-DC E-UTRA-NR dual connectivity
en-gNB or En-gNB node providing NR user plane and control plane protocol terminations towards the UE, and acting as secondary node in EN-DC
E-UTRA evolved universal terrestrial radio access, i.e., the LTE radio access technology
GC-DCI group common DCI
gNB (or gNodeB) base station for 5G/NR, i.e., a node providing NR user plane and control plane protocol terminations towards the UE, and connected via the NG interface to the 5GC
HO handover
IE information element
I/F interface
LSB least significant bit
LTE long term evolution
MAC medium access control
MCS modulation and coding scheme
MIMO multiple input multiple output
MME mobility management entity
MPR maximum power reduction
MSB most significant bit
NES network energy saving
ng or NG new generation
ng-eNB or NG-eNB new generation eNB
NR new radio
N/W or NW network
OFDM orthogonal frequency division multiplexing
PBCH physical broadcast channel
PCI physical cell identity
PDCCH physical downlink control channel
PDCP packet data convergence protocol
PDU protocol data unit
PHR power headroom report
PHY physical layer
PSS primary synchronization signal
PUSCH physical uplink control channel
QPSK quadrature phase shift keying
RAN radio access network
RB, PRB resource block, physical resource block
Rel release
RLC radio link control
RNTI radio network temporary identifier
RRC radio resource control
RRH remote radio head
RRM radio resource management
RS reference signal
RSRP reference signal received power
RSRQ reference signal received quality
RU radio unit
Rx receiver
SDAP service data adaptation protocol
S/P serial-to-parallel
SGW serving gateway
SMF session management function
SR scheduling request
SSB synchronization signal block
SSS secondary synchronization signal
TB transform block
TEI technical enhancement item
TPC transmit power control
TS technical specification
Tx transmitter
UE user equipment (e.g., a wireless, typically mobile device)
UL uplink
UPF user plane function
WI work item Turning to FIG. 1, this figure shows a block diagram of one possible and non-limiting example in which the examples may be configured to operate in accordance with a cellular communication standard such as, for example, long term evolution, LTE, or fifth generation, 5G, also known as New Radio, NR, 5G-Advanced (i.e. NR Rel-18 and beyond) as well as 6G in which all specified by the 3rd generation partnership project, 3GPP. A user equipment (UE) 110, radio access network (RAN) node 170, and network element(s) 190 are illustrated. In the example of FIG. 1, the user equipment (UE) 110 is in wireless communication with a wireless network 100. A UE is a wireless device that can access the wireless network 100. The UE 110 includes one or more processors 120, one or more memories 125, and one or more transceivers 130 interconnected through one or more buses 127. Each of the one or more transceivers 130 includes a receiver, Rx, 132 and a transmitter, Tx, 133. The one or more buses 127 may be address, data, or control buses, and may include any interconnection mechanism, such as a series of lines on a motherboard or integrated circuit, fiber optics or other optical communication equipment, and the like. The one or more transceivers 130 are connected to one or more antennas 128. The one or more memories 125 include computer program code 123. The UE 110 includes a module 140, comprising one of or both parts 140-1 and/or 140-2, which may be implemented in a number of ways. The module 140 may be implemented in hardware as module 140-1, such as being implemented as part of the one or more processors 120. The module 140-1 may be implemented also as an integrated circuit or through other hardware such as a programmable gate array. In another example, the module 140 may be implemented as module 140-2, which is implemented as computer program code 123 and is executed by the one or more processors 120. For instance, the one or more memories 125 and the computer program code 123 may be configured to, with the one or more processors 120, cause the user equipment 110 to perform one or more of the operations as described herein. The UE 110 communicates with RAN node 170 via a wireless link 111.

The RAN node 170 in this example is a base station that provides access by wireless devices such as the UE 110 to the wireless network 100. The RAN node 170 may be, for example, a base station for 5G, also called New Radio (NR). In 5G, the RAN node 170 may be a NG-RAN node, which is defined as either a gNB or a ng-eNB. A gNB is a node providing NR user plane and control plane protocol terminations towards the UE, and connected via the NG interface to a 5GC (such as, for example, the network element(s) 190). The ng-eNB is a node providing E-UTRA user plane and control plane protocol terminations towards the UE, and connected via the NG interface to the 5GC. The NG-RAN node may include multiple gNBs, which may also include a central unit (CU) (gNB-CU) 196 and distributed unit(s) (DUs) (gNB-DUs), of which DU 195 is shown. Note that the DU may include or be coupled to and control a radio unit (RU). The gNB-CU is a logical node hosting RRC, SDAP and PDCP protocols of the gNB or RRC and PDCP protocols of the en-gNB that controls the operation of one or more gNB-DUs. The gNB-CU terminates the F1 interface connected with the gNB-DU. The F1 interface is illustrated as reference 198, although reference 198 also illustrates a link between remote elements of the RAN node 170 and centralized elements of the RAN node 170, such as between the gNB-CU 196 and the gNB-DU 195. The gNB-DU is a logical node hosting RLC, MAC and PHY layers of the gNB or en-gNB, and its operation is partly controlled by gNB-CU. One gNB-CU supports one or multiple cells. One cell is supported by only one gNB-DU. The gNB-DU terminates the F1 interface 198 connected with the gNB-CU. Note that the DU 195 is considered to include the transceiver 160, e.g., as part of a RU, but some examples of this may have the transceiver 160 as part of a separate RU, e.g., under control of and connected to the DU 195. The RAN node 170 may also be an eNB (evolved NodeB) base station, for LTE (long term evolution), or any other suitable base station or node.

The RAN node 170 includes one or more processors 152, one or more memories 155, one or more network interfaces (N/W I/F(s)) 161, and one or more transceivers 160 interconnected through one or more buses 157. Each of the one or more transceivers 160 includes a receiver, Rx, 162 and a transmitter, Tx, 163. The one or more transceivers 160 are connected to one or more antennas 158. The one or more memories 155 include computer program code 153. The CU 196 may include the processor(s) 152, memories 155, and network interfaces 161. Note that the DU 195 may also contain its own memory/memories and processor(s), and/or other hardware, but these are not shown.

The RAN node 170 includes a module 150, comprising one of or both parts 150-1 and/or 150-2, which may be implemented in a number of ways. The module 150 may be implemented in hardware as module 150-1, such as being implemented as part of the one or more processors 152. The module 150-1 may be implemented also as an integrated circuit or through other hardware such as a programmable gate array. In another example, the module 150 may be implemented as module 150-2, which is implemented as computer program code 153 and is executed by the one or more processors 152. For instance, the one or more memories 155 and the computer program code 153 are configured to, with the one or more processors 152, cause the RAN node 170 to perform one or more of the operations as described herein. Note that the functionality of the module 150 may be distributed, such as being distributed between the DU 195 and the CU 196, or be implemented solely in the DU 195.

The one or more network interfaces 161 communicate over a network such as via the links 176 and 131. Two or more gNBs 170 may communicate using, e.g., link 176. The link 176 may be wired or wireless or both and may implement, for example, an Xn interface for 5G, an X2 interface for LTE, or other suitable interface for other standards.

The one or more buses 157 may be address, data, or control buses, and may include any interconnection mechanism, such as a series of lines on a motherboard or integrated circuit, fiber optics or other optical communication equipment, wireless channels, and the like. For example, the one or more transceivers 160 may be implemented as a remote radio head (RRH) 195 for LTE or a distributed unit (DU) 195 for gNB implementation for 5G, with the other elements of the RAN node 170 possibly being physically in a different location from the RRH/DU, and the one or more buses 157 could be implemented in part as, for example, fiber optic cable or other suitable network connection to connect the other elements (e.g., a central unit (CU), gNB-CU) of the RAN node 170 to the RRH/DU 195. Reference 198 also indicates those suitable network link(s).

It is noted that description herein indicates that "cells" perform functions, but it should be clear that equipment which forms the cell will perform the functions. The cell makes up part of a base station. That is, there can be multiple cells per base station. For example, there could be three cells for a single carrier frequency and associated bandwidth, each cell covering one-third of a 360 degree area so that the single base station's coverage area covers an approximate oval or circle. Furthermore, each cell can correspond to a single carrier and a base station may use multiple carriers. So if there are three 120 degree cells per carrier and two carriers, then the base station has a total of 6 cells.

The wireless network 100 may include a network element or elements 190 that may include core network functionality, and which provides connectivity via a link or links 181 with a further network, such as a telephone network and/or a data communications network (e.g., the Internet). Such core network functionality for 5G may include access and mobility management function(s) (AMF(S)) and/or user plane functions (UPF(s)) and/or session management function(s) (SMF(s)). Such core network functionality for LTE may include MME (Mobility Management Entity)/SGW (Serving Gateway) functionality. These are merely exemplary functions that may be supported by the network element(s) 190, and note that both 5G and LTE functions might be supported. The RAN node 170 is coupled via a link 131 to a network element 190. The link 131 may be implemented as, e.g., an NG interface for 5G, or an SI interface for LTE, or other suitable interface for other standards. The network element 190 includes one or more processors 175, one or more memories 171, and one or more network interfaces (N/W I/F(s)) 180, interconnected through one or more buses 185. The one or more memories 171 include computer program code 173. The one or more memories 171 and the computer program code 173 are configured to, with the one or more processors 175, cause the network element 190 to perform one or more operations.

The wireless network 100 may implement network virtualization, which is the process of combining hardware and software network resources and network functionality into a single, software-based administrative entity, a virtual network. Network virtualization involves platform virtualization, often combined with resource virtualization. Network virtualization is categorized as either external, combining many networks, or parts of networks, into a virtual unit, or internal, providing network-like functionality to software containers on a single system. Note that the virtualized entities that result from the network virtualization are still implemented, at some level, using hardware such as processors 152 or 175 and memories 155 and 171, and also such virtualized entities create technical effects.

The computer readable memories 125, 155, and 171 may be of any type suitable to the local technical environment and may be implemented using any suitable data storage technology, such as semiconductor based memory devices, flash memory, magnetic memory devices and systems, optical memory devices and systems, fixed memory and removable memory. The computer readable memories 125, 155, and 171 may be means for performing storage functions. The processors 120, 152, and 175 may be of any type suitable to the local technical environment, and may include one or more of general purpose computers, special purpose computers, microprocessors, digital signal processors (DSPs) and processors based on a multi-core processor architecture, as non-limiting examples. The processors 120, 152, and 175 may be means for performing functions, such as controlling the UE 110, RAN node 170, and other functions as described herein.

In general, the various embodiments of the user equipment 110 can include, but are not limited to, cellular telephones such as smart phones, tablets, personal digital assistants (PDAs) having wireless communication capabilities, portable computers having wireless communication capabilities, image capture devices such as digital cameras having wireless communication capabilities, gaming devices having wireless communication capabilities, music storage and playback appliances having wireless communication capabilities, Internet appliances permitting wireless Internet access and browsing, tablets with wireless communication capabilities, as well as portable units or terminals that incorporate combinations of such functions.

Features as described herein may be used in regard to how to configure a UE to perform and report radio resource management (RRM) measurements of target cell(s) which may be in a network energy savings (NES) state.

Figure 2:
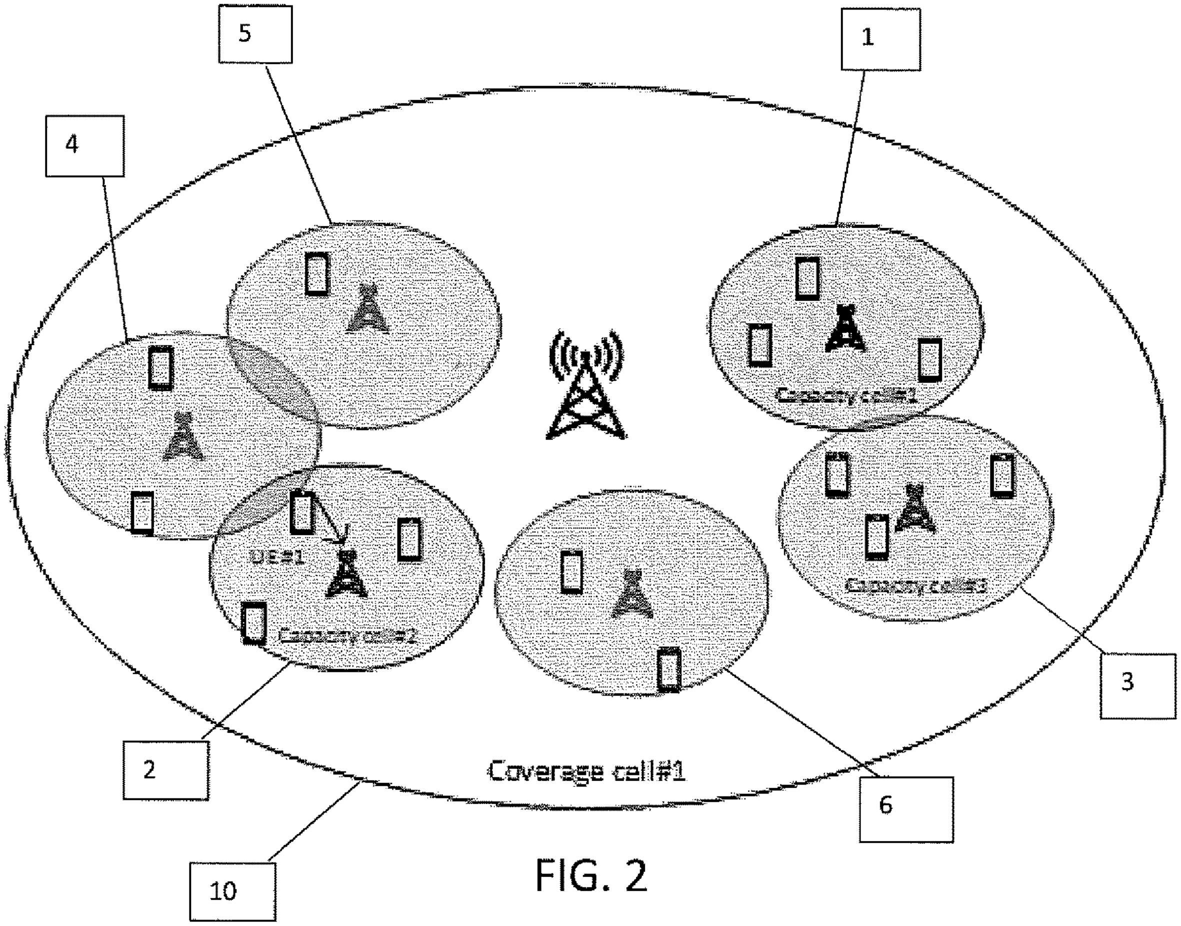
FIG. 2 is a diagram illustrating a network including a coverage area of a cell served with a macro base station (BS), coverage areas of small cells, and user equipments.

A NW deployment is depicted in FIG. 2. The large ellipse represents the coverage area of a cell served with a macro base station (BS), denoted as "coverage cell". The smaller ellipses represent the coverage areas of small cells, denoted as "capacity cells". As its name suggests, the coverage cell provides basic "underlay" coverage in the network of a certain area, and the small cells are overlaid over the coverage cell for capacity boosting purposes particularly within so-called "hot spot zones". UEs can be served by the coverage cell or by a capacity cell such as illustrated with UE1 in FIG. 2.

Capacity cells can be active (as shown in FIG. 2 with the capacity cells 1, 2 and 3) or in network energy saving (NES) state (as shown in FIG. 2 with the grey capacity cells 4, 5 and 6) during low load/empty periods by applying one or multiple energy saving techniques as listed below (and such as described in TR 38.864 for example):

- Infrequent Synchronization Signal Block (SSB) transmission, e.g., SSB periodicity of 160 ms (current maximum periodicity as per current specifications)
- Lean or light SSB or Discovery Reference signal (DRS) transmission: e.g., two symbols for PSS and could be transmitted SSS instead of legacy SSBs (PSS+SSS+PBCH) to announce the presence of the cell and to enable UEs to acquire synchronization.

The NES state of the several capacity cells can be turned changed depending on the need, e.g., to offload the traffic or to boost the overall capacity in addition to the coverage cell's capacity. While in NES state, and when there are no Tx/Rx operations, the BS can enter sleep states as defined in TR 38.864 and listed below:

- Micro sleep state: defined by enabling micro discontinuous Transmission (DTx) feature, which consists in shutting down the Power Amplifier on a per OFDM symbol basis, in symbols that do not carry data nor signalling.
- Light sleep state: where additional components could be shut down.
- Deep sleep state: where most of BS's components are shut down.

RRM Measurements and Reporting

The network may configure a RRC_CONNECTED user equipment to perform measurements and reporting which can either be derived based on SS/PBCH block and/or CSI-RS measurements.

Each configuration (MeasConfig) includes:

- Measurement objects (time and frequency location of the signal to be measured)
- Reporting configuration (trigger event and report format)
- Measurement identity (linking measurement objects and reporting configurations)
- Quantity configuration (defines filtering)
- Measurement gaps (if applicable)

Details may be found, for example, at:

- 3GPP TS 38.300: NR; NR and NG-RAN Overall Description
- 3GPP TS 38.331: NR; Radio Resource Control (RRC); Protocol specification
- 3GPP TS 38.215, NR; Physical layer measurements Features as described herein may be used in regard to addressing RRM measurements on target cells, which may be in network energy saving (NES) state. As noted above, the NES state may entail that the cell is not detectable (no SSB transmission, e.g. in certain SSB beams) or that the (light) SSBs are transmitted with a long periodicity. Furthermore, the serving cell, which configures the RRM measurements and reporting for the UE, may not be aware of the target cell(s) NES state, and especially may not be informed about a change in the NES state (e.g., the target cell moves to a NES state after the measurement is configured).

Moreover, a cell in a NES mode may need a significant amount of time to reactivate its currently shutdown components and to become fully operational and available as a target cell such as, for example, if a UE through RRM measurements has identified the cell as a suitable target cell. Such reactivation delay would introduce an undesired latency in the HO procedure and, hence, may increase the total packet delay and the UE energy consumption.

Additionally, a target cell may prefer to limit the transitions to an active state (i.e., avoid ping-pong between NES states) and remain in an NES mode for a while until there is a strong need such as, for example, multiple UEs identifying the cell as a suitable candidate.

Thus, features as described herein may be used to configure a UE to perform and report RRM measurements of target cell(s) which may be in a NES state.

Mobility aspects have been discussed in this 3GPP email discussion: R2-2213703. Most of the discussion is focused on whether a UE configured with a CHO shall determine the NES state of the target cell, or be informed by the source cell about the target cell NES state. Likewise, there are discussions on whether the UE is aware of the source cell's NES state.

The summary of the discussion is as follows:

Regarding Scenario 2 (NES state of target cell awareness) and CHO:

Supporting companies see that the NES state of target cells may change so frequently that it would not be practical to reconfigure events all the time (when NES state of neighbour cell changes). For the solutions, it is proposed that the CHO event is aware of target cell(s) NES state with possible priority indication between target cells for the case that CHO conditions are met for multiple cells.

Skeptical companies were saying that it would be possible for NW already to configure HO/measurement events to take target cell state into account. This might involve RAN3 to transfer NES state of neighbour cells though.

Thus, the discussion did not focus on the actual measurements considering the target cell NES state, nor that the reporting (content) about the target cell could consider the NES state. It is also worth noting the discussion is centered on CHO events and not the measurement report event, which precedes both ordinary handover and CHO.

As noted in the summary, some companies considered the network would already be aware of the NES state of the target cell, which means the network would decide beforehand whether to configure a certain cell as a CHO target. However, this does not solve the issue when the target cell changes state after the UE is configured with the measurement/CHO.

Huawei (R2-2212872) would rely just RAN3 handling by exchanging NES state of neighbour cells between gNBs: The possible enhancement is to enable the NG-RAN nodes to exchange the cell NES state, in order to avoid handing over non-NES-capable UEs to a NES cell. This is within the scope of RAN3. No RAN2 enhancements is needed.

Intel (R2-2212115) proposes to postpone target cell NES mode as part of CHO trigger: Observation No. 4: For Scenario 2 where the CHO execution condition also considers the NES mode of target candidate PCells, depending on the NES mode definition, potential frequent reconfiguration of the NES mode of the candidate PCells will need to be considered.

Fujitsu (R2-2212641): Observation 1: The network can configure the target cell considering the NES state of its cell. The network can decide to prevent the NES cell as CHO target cell. Observation 2: The UE evaluates the target cell indicated in the CHO configuration without NES state consideration. Proposal 2: NES state aware CHO is not considered in Rel-18 NES.

LG (R2-2212823): Observation 4. In NES, it is difficult to determine how much performance the target cell can provide by referring only to the NES state. That is, it is difficult for the UE to directly determine the cell most suitable among several candidates. Proposal 4. NW decides candidates for CHO based on NES state of target cell and UE's data traffic. (UE does not decide (de)prioritization of NES cell depending on the NES state of the target cell)

With features as described herein, the source cell may configure the UE to perform enhanced RRM measurements and reporting related to a target cell potentially being in a NES mode to facilitate the handover decision towards the target cell. This may comprise:

a. Provision of more than one configuration for RRM measurement and reporting
b. Second measurement and reporting configuration
c. Determination of the NES cell by UEs Provision of More than One Configuration for RRM Measurement and Reporting If the serving cell is aware of the target cell NES state and/or potential switching to NES state, it provides UEs with at least two sets of measurement and reporting configuration including:

A first measurement and reporting configuration as per legacy specification to be used by UEs for target cell that are not in NES state.

A second measurement and reporting configuration to be used by UEs for target cells that are in NES state.

The determination of the NES state of the target cell can be performed by the UE or provided by the serving cell, e.g., in the form of a list of PCI (and frequencies) of cells (and layers) in NES state, potentially complemented with indication of when the NES state change will happen.

Optionally, the serving cell may provide additional instruction to the UE to prioritize measuring and/or reporting non-NES cells in order to ensure that at least one of the reported cells is unconstrained for HO due to NES state.

As an example, the instruction could be to report at least one non-NES cell whenever it reports for a NES cell.

Else if the serving cell is not aware of the target cell NES state, it provides UEs with at least two sets of measurement and reporting configuration as explained above, to be applied depending on the NES state of the target cell.

In this case, the determination of the NES state of the target cell can only be performed by the UE. Further details on this UE-based determining is provided below.

In both cases, the UE is assumed to switch from using the first to the second configuration upon detecting that at least one potential target cell for which the second configuration is configured enters a NES state and return to the first configuration when the NES state is exited.

The reporting should only include the measurements performed with respect to the current measurement and reporting configuration, i.e. previous measurements should not be included in the reporting. Alternatively, the UE provides two sets of measurements; one per target cell NES state.

Second Measurement and Reporting Configuration

The second measurement and reporting configuration dedicated to NES may include:

A. Different RSRP/RSRQ measurement event thresholds or hysteresis for different cell NES states For example, the RSRP threshold (e.g. A3 threshold) may be set to a higher value when a target cell is in NES state, because the radio quality conditions have to be very good to justify the need for cell re-activation (i.e. cell returning to a normal operational state).

B. Different measurement and reporting conditions for different NES cell states

For example, the UE may only measure cells that are not in NES state

For example, the UE may only report cells that are not in NES state

C. The UE may be configured to indicate the estimated NES state in the measurement reports.

Determination of the NES Cell by UEs

UEs can be configured to determine the current NES state of the target cell based on an implicit or explicit indication:

In one option, the UE can determine the NES state of the target cell implicitly based on the received RS type, i.e., legacy SSB or light SSB/DRS (e.g., PSS+SSS only)

In another option, the UE can determine the NES state of the target cell implicitly from the observed RS transmission e.g., from its periodicity A cell in NES state could set longer RS periodicity as compared to legacy cells, and/or A cell in NES state could set longer RS periodicity for a subset of SSB beams as compared to legacy cells, and/or A cell in NES state could transmit only a subset of SSB beams as compared to legacy cells. A legacy cell may be considered as a cell which is not in a network energy savings (NES) state.

In another option, the UE can determine the NES state of the target cell explicitly based on the content of the SSB which may include e.g., 1 bit information on NES state.

The UE may assume that the determination of a target cell in NES state remains valid for the next x measurement occasions. For example, the UE may not need to perform the decoding of the NES state information bit at every measurement.

If the UE receives instructions to prioritize reporting non-NES cells, it can limit or avoid measuring and reporting NES cells that were determined (using one of the options explained above) or identified by the serving cell.

Figure 3:
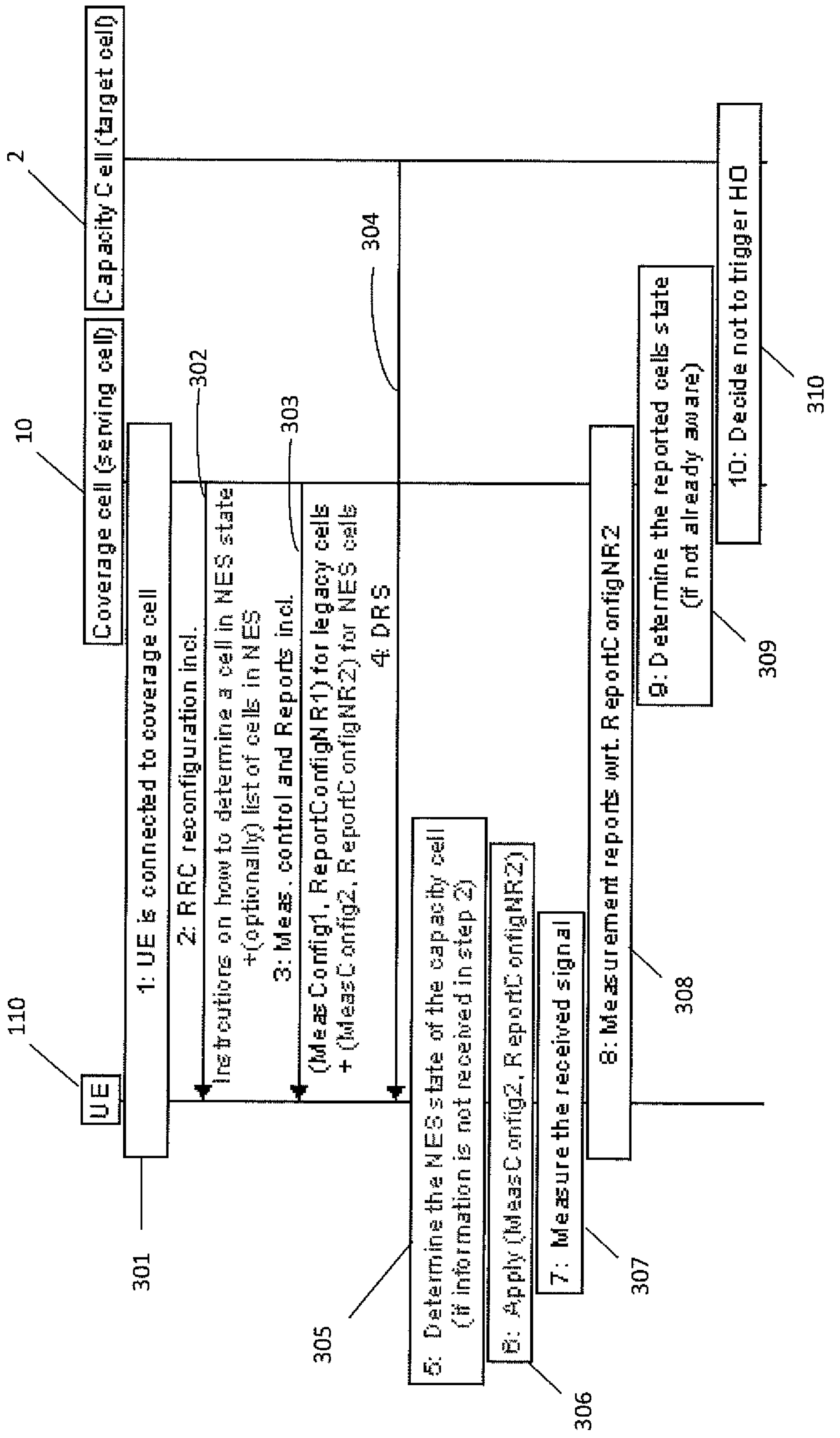
FIG. 3 is a diagram illustrating an example method.

FIG. 3 shows one type of example of a signaling flow when a UE is configured to determine the NES of a target cell. This example signaling flow will be described with reference the example network shown to FIG. 2 comprising the coverage cell 10 and one of the capacity cells, cell 2, which is in NES. As indicated with 301, the UE 110 (UE #1 in cell 2) is in a RRC connected state in the coverage cell 10 and receives reference signals from other cells (such as the capacity cell 2 in this example). The coverage cell 10 comprises the RAN node 170, and the capacity cell 2 comprises another RAN node.

In step 2 at 302, the UE receives instructions on how to determine the NES state of any potential target cell as described above. As an example, it can be an indication of the RS type and/or RS periodicity that would define a NES state of a cell, or list of PCIs and/or frequency layers in NES state. The instructions may be provided by means of dedicated signaling such as, for example, using the RRCReconfiguration or a MAC control element. Alternatively, an explicit IE could be added to legacy RS content to announce the NES state of the cell (such as, for example, an NES bit in SSB broadcast). As noted above, the determination could be based on implicit or explicit indication such as, for example, provided through the received reference signals. According to the example showed in FIG. 3, the UE may be instructed to consider the cell in NES state if DRS is received instead of legacy SSB. Alternatively, the UE might not receive such instructions, but determines the NES state autonomously such as, for example, also based on receiving DRS instead of legacy SSB. As shown in FIG. 3, at step 2, the UE may receive instructions on how to determine a cell is in NES state and, optionally, a list of cells in NES.

In step 3 at 303, the source cell or coverage cell 10 configures the UE with a first measurement and reporting configuration (such as MeasConfig1, ReportConfigNR1 for example) as per legacy specification to be used for target cells that are not in NES state. However with the example shown, in addition to the first measurement and reporting configuration, the source cell or coverage cell 10 also configures the UE with a second measurement and reporting configuration (such as MeasConfig2, ReportConfigNR2 for example) to be used for target cells that are in NES state. In one option from the ones described, the difference between two configurations could be in a MeasTriggerQuantity, i.e. specific RSRP/RSRQ threshold is defined for NES cells. In another option, the difference could be in a NR-RS-Type::=DRS, instead of legacy SSB, CSI-RS for periodical reports. DRS (discovery reference signal) is a simplified version of the SSB. The DRS only contains the primary and secondary synchronization signals (PSS and SSS), whereas the SSB includes these and the physical broadcast channel, which carries the master information block and demodulation reference signals. Thus, the configuration could indicate to only measure DRS and not SSB, or only measure CSI-RS. The difference could be in the reference signal type to be used for performing measurements and reports. Discovery reference signals (DRS) also called light SSB (e.g., PSS+SSS only) can be used instead of legacy SSB, CSI-RS. DRS is also used in LTE small cell with a similar function as 5G NR, as a synchronization signal.

Based on the received DRS from the capacity cell as indicate with 304, the UE may determine at step 5 (305) that the target cell (cell 4 in this example) is in NES state, if not already known from step 2 in which the source cell might have provided information on cells in NES state. In step 6 (306) the UE may apply the second measurement and reporting configuration received from the serving cell.

At step 7 (307) the UE may measure the received signal, and at step 8 (308), the UE may report the measurements based on the second configuration (ReportConfigNR2) where DRS are measured and specific RSRP/RSRQ threshold are used for triggering the reporting event. The serving cell may identify the capacity cell (cell 4 in this example) as a potential suitable cell for HO, determines whether the capacity cell is in NES state, and decide whether to trigger HO or not. The HO decision could be based on the following considerations:

UE traffic QoS requirements such as, for example, if additional latency from cell activation could be afforded or not. For instance, for delay-stringent applications, the HO towards cells in NES state is to be avoided.

Number of UEs identifying the same target cell as a suitable candidate for HO. The source cell may decide to issue a HO request to a target cell in NES state when multiple UEs reported the same suitable target cell.

Predefined rules established by the Operations, Administration and Management (OA&M) and applied by all cells in the network. As an example, the source cell shall not issue a HO request message to a target cell determined that is in NES state.

As showed in FIG. 3, as indicated by steps 9 and 10 (309, 310) the source cell may decide that the HO towards the capacity cell is not allowed, and considers other reported cells for HO.

If the NES state of the target cells cannot be determined from the reported measurements, the serving cell may rely on legacy means such as:

i. Xn-based information exchange between neighboring cells such as, for example, when a cell enters/leaves a NES state.

ii. Otherwise, the serving cell may get the NES state of potential target cells through an HO request addressed towards the identified suitable cell for a given UE.

The target cell may reply with an HO request acknowledgment if it is willing to wake up. The HO ACK could include additional information, such as the availability time of the cell for example. In one example, the activation is triggered immediately after sending the HO request ACK. In another example, the activation is triggered when receiving RRC configuration complete from the UE (CHO)

Otherwise, the target cell may reject the HO request due to the NES state, such as by optionally including a cause value related to its NES state for example.

Figure 4:
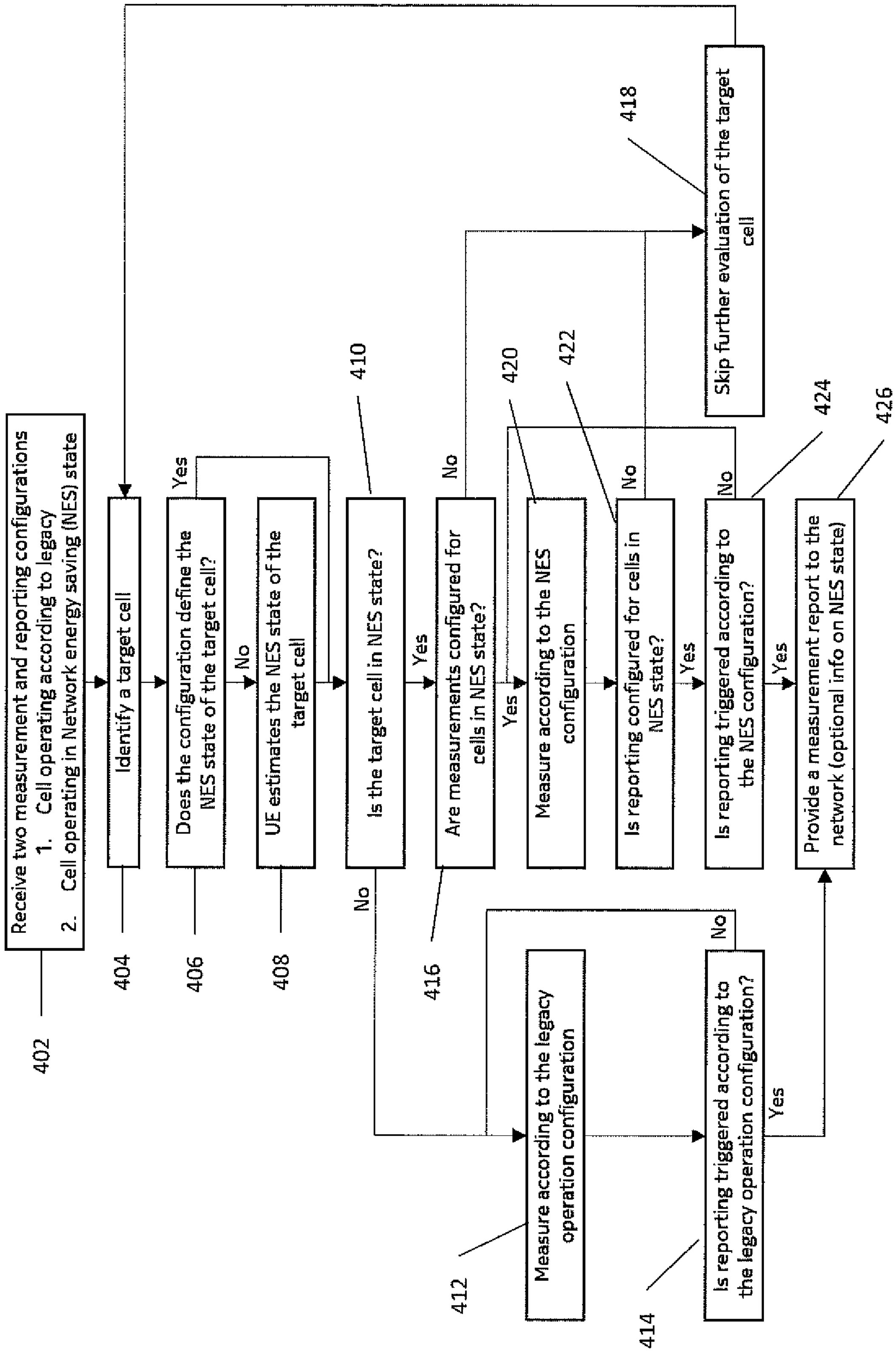
FIG. 4 is a diagram illustrating an example method.

FIG. 4 illustrates a flow chart in regard to one example method. It is worth noting that the order of determining whether measurement and reporting is configured for a cell identified to be in NES state can be interchanged. The UE may receive two measurement and reporting configurations as indicated by block 402. This may include 1. the cell operating according to legacy, and 2. the cell operating in NES state. The UE may identify a target cell as indicated by block 404. The UE may determine if the configuration defines the NES state of the target cell as indicated by block 406. If no, the UE may estimate the NES state of the target cell as indicated by block 408. If yes, the UE may determine if the target cell is in NES state as indicated by block 410.

If the determination at block 410 is no, the UE may measure according to the legacy operation configuration as indicated by block 412 using the first measurement and reporting configuration (such as MeasConfig1, ReportConfigNR1 for example) received at 303 and 402. The UE may then determine if reporting is triggered according to the legacy operation configuration as indicated by block 414. If the determination at block 414 is no, the process may return to block 412. If the determination at block 414 is yes, the process may proceed to the measurement reporting as indicated by block 426.

If the determination at block 410 is yes, the UE may determine if measurements are configured for cells in NES state as indicated by block 416. If the determination at block 416 is no, the process may proceed to block 418 to skip further evaluation of the target cell as indicated by block 416 and return to the process step at 404 to identify another different target cell. If the determination at block 416 is yes, the UE may measure according to the NES configuration as indicated by block 420; using the second measurement and reporting configuration (such as MeasConfig2, ReportConfigNR2 for example) received at 303 and 402.

The UE may then determine if reporting is configured for cells in the NES state as indicate by block 422. If the determination at block 422 is no, the process may proceed to block 418 to skip further evaluation of the target cell and return to the process step at 404 to identify another different target cell. If the determination at block 422 is yes, the UE may determine if reporting is triggered according to the NES configuration as indicated by block 424. If the determination at block 424 is no, the process may proceed back to block 420. If the determination at block 424 is yes, the UE may proceed to the measurement reporting as indicated by block 426.

With features as described herein, UE assistance may be leveraged to enhance HO operation, in terms of RRM measurement and reporting, in the presence of NES target cells.

With features as described herein, a capacity cell's energy saving potential may be improved, particularly when the capacity cell is in NES state, by controlling the HO and avoiding ping-pong effects.

With features as described herein, the UE may be configured with multiple RRM configurations for the same cell/frequency layer, which may enable the network to save signaling overhead, because it does not need to reconfigure the UE measurement configuration whenever the target cell changes NES state.

Features as described herein are described in the context of RRC Connected mode mobility. However, the network could also provide multiple measurement configurations for RRC Idle/Inactive UEs. For example, the cell reselection criteria (Srxlev and Squal, see TS 38.304) may be made dependent on the determined NES state.

Figure 5:
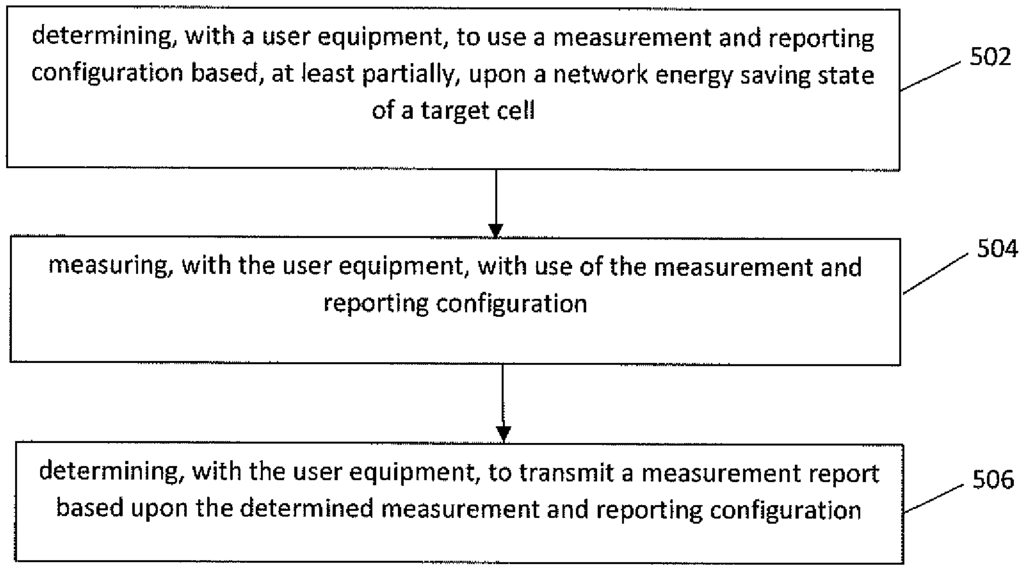
FIG. 5 is a diagram illustrating an example method.

Referring also to FIG. 5, in accordance with an example embodiment, an example method is provided comprising determining, with a user equipment, to use a measurement and reporting configuration based, at least partially, upon a network energy saving state of a target cell as indicated with 502; measuring, with the user equipment, with use of the measurement and reporting configuration as indicated with 504; and determining, with the user equipment, to transmit a measurement report based upon the determined measurement and reporting configuration as indicated with 506.

The method may further comprise receiving, with the user equipment, at least two different sets of measurement and reporting configurations; and wherein the determining to use the measurement and reporting configuration comprises selecting, with the user equipment, one of the at least two different sets of measurement and reporting configurations. The at least two different sets of measurement and reporting configurations may comprise: a first set of measurement and reporting configuration configured to be used by the user equipment for a target cell which is not in the network energy saving state, and a second set of measurement and reporting configuration configured to be used by the user equipment for a target cell that is in the network energy saving state. The method may further comprise receiving, with the user equipment, at least one of: an indication regarding how to determine when the target cell is in the network energy saving state, an indication of at least one target cell being in the network energy saving state, or an indication of one or more target cells potentially switching to the network energy saving state. The indication may comprise at least one of: a list of physical cell identity and frequencies of cells and layers in network energy saving state, an indication of when a network energy saving state change will happen, or an instruction or information for the user equipment to prioritize measuring and/or reporting of cells which are not in a network energy saving state. The method may further comprise determining, with the user equipment, whether the target cell is in the network energy saving state. The determining whether the target cell is in the network energy saving state may comprise implicitly determining the network energy saving state based upon at least one of: determining the target cell is using a different reference signal type as compared to a cell which is not in a network energy saving state, determining the target cell is using a longer reference signal periodicity as compared to a cell which is not in a network energy saving state, an indication received from a serving cell based upon reference signal periodicity, determining the target cell is using a longer reference signal periodicity for a subset of synchronization signal block beams as compared to a legacy cell, or determining the target cell is transmitting only a subset of synchronization signal block beams as compared to a legacy cell. The determining of the measurement and reporting configuration may comprise determining whether the target cell is indicated with the received indication. The determining whether the target cell is in the network energy saving state may comprise one of: use of the received indication of the at least one target cell being in the network energy saving state, or use of the received indication regarding how to determine when the target cell is in the network energy saving state. The determining of the network energy saving state of the target cell may be explicitly indicated in dedicated RRC signaling or a MAC control element or system information. The determining of the network energy saving state of the target cell may be explicitly indicated based on content of the SSB which includes information related to the network energy saving state. The method may further comprise transmitting the measurement report including sending information regarding an estimated network energy saving state of the target cell. The method may further comprise setting, with the user equipment, a timer limit, from the determining of whether the target cell is in the network energy saving state, to repeat the determining of whether the target cell is in the network energy saving state. The method may further comprise prioritizing, with the user equipment, wherein the prioritizing comprises at least one of: measuring regarding a target cell which is not in a network energy saving state before measuring regarding a target cell which is in a network energy saving state, reporting regarding a target cell which is not in a network energy saving state before reporting regarding a target cell which is in a network energy saving state, or preventing the measuring and reporting based upon determining that another cell is not in the network energy saving state. The method may further comprise receiving, with the user equipment, prioritization information, where the prioritization information is configured to be used by the user equipment to performing measurement and/or report. At least one of the at least two different sets of measurement and reporting configurations may comprise at least one of: different RSRP or RSRQ measurement triggers for different network energy saving states, reporting event thresholds or hysteresis for different network energy saving states, or different measurement and reporting conditions for different network energy saving cell states. At least two of the at least two different sets of measurement and reporting configurations may comprise different reference signals.

In accordance with an example embodiment, an example apparatus may be provided comprising: at least one processor; and at least one non-transitory memory storing instructions that, when executed with the at least one processor, cause the apparatus to perform: determining, with the apparatus, to use a measurement and reporting configuration based, at least partially, upon a network energy saving state of a target cell; measuring, with the apparatus, with use of the measurement and reporting configuration; and determining, with the apparatus, to transmit a measurement report based upon the determined measurement and reporting configuration.

The instructions, when executed with the at least one processor, may cause the apparatus to perform: receiving, with the apparatus, at least two different sets of measurement and reporting configurations; and wherein the determining to use the measurement and reporting configuration comprises selecting, with the apparatus, one of the at least two different sets of measurement and reporting configurations. The at least two different sets of measurement and reporting configurations may comprise: a first set of measurement and reporting configuration configured to be used by the apparatus for a target cell which is not in the network energy saving state, and a second set of measurement and reporting configuration configured to be used by the apparatus for a target cell that is in the network energy saving state. The instructions, when executed with the at least one processor, may cause the apparatus to perform at least one of: an indication regarding how to determine when the target cell is in the network energy saving state, an indication of at least one target cell being in the network energy saving state, or an indication of one or more target cells potentially switching to the network energy saving state. The indication may comprise at least one of: a list of physical cell identity and frequencies of cells and layers in network energy saving state, an indication of when a network energy saving state change will happen, or an instruction or information for the apparatus to prioritize measuring and/or reporting of cells which are not in a network energy saving state. The instructions, when executed with the at least one processor, may cause the apparatus to perform determining, with the apparatus, whether the target cell is in the network energy saving state. The determining whether the target cell is in the network energy saving state may comprise implicitly determining the network energy saving state based upon at least one of: determining the target cell is using a different reference signal type as compared to a cell which is not in a network energy saving state, determining the target cell is using a longer reference signal periodicity as compared to a cell which is not in a network energy saving state, an indication received from a serving cell based upon reference signal periodicity, determining the target cell is using a longer reference signal periodicity for a subset of synchronization signal block beams as compared to a legacy cell, or determining the target cell is transmitting only a subset of synchronization signal block beams as compared to a legacy cell. The determining of the measurement and reporting configuration may comprise determining whether the target cell is indicated with the received indication. The determining whether the target cell is in the network energy saving state may comprise one of: use of the received indication of the at least one target cell being in the network energy saving state, or use of the received indication regarding how to determine when the target cell is in the network energy saving state. The determining of the network energy saving state of the target cell may be explicitly indicated in dedicated RRC signaling or a MAC control element or system information. The determining of the network energy saving state of the target cell may be explicitly indicated based on content of the SSB which includes information related to the network energy saving state. The instructions, when executed with the at least one processor, may cause the apparatus to perform transmitting the measurement report including sending information regarding an estimated network energy saving state of the target cell. The instructions, when executed with the at least one processor, may cause the apparatus to perform setting, with the apparatus, a timer limit, from the determining of whether the target cell is in the network energy saving state, to repeat the determining of whether the target cell is in the network energy saving state. The instructions, when executed with the at least one processor, may cause the apparatus to perform prioritizing, with the apparatus, wherein the prioritizing comprises at least one of: measuring regarding a target cell which is not in a network energy saving state before measuring regarding a target cell which is in a network energy saving state, reporting regarding a target cell which is not in a network energy saving state before reporting regarding a target cell which is in a network energy saving state, or preventing the measuring and reporting based upon determining that another cell is not in the network energy saving state. The instructions, when executed with the at least one processor, cause the apparatus to perform receiving, with the apparatus, prioritization information, where the prioritization information is configured to be used by the apparatus to performing measurement and/or report. At least one of the at least two different sets of measurement and reporting configurations may comprise at least one of: different RSRP or RSRQ measurement triggers for different network energy saving states, reporting event thresholds or hysteresis for different network energy saving states, or different measurement and reporting conditions for different network energy saving cell states. At least two of the at least two different sets of measurement and reporting configurations may comprise different reference signals.

In accordance with an example embodiment, an example apparatus may be provided comprising: means for determining, with a user equipment, to use a measurement and reporting configuration based, at least partially, upon a network energy saving state of a target cell; means for measuring, with the user equipment, with use of the measurement and reporting configuration; and means for determining, with the user equipment, to transmit a measurement report based upon the determined measurement and reporting configuration.

In accordance with an example embodiment, an example apparatus may be provided comprising: circuitry configured for determining, with a user equipment, to use a measurement and reporting configuration based, at least partially, upon a network energy saving state of a target cell; circuitry configured for measuring, with the user equipment, with use of the measurement and reporting configuration; and circuitry configured for determining, with the user equipment, to transmit a measurement report based upon the determined measurement and reporting configuration.

In accordance with an example embodiment, an example apparatus may be provided comprising a non-transitory program storage device readable by an apparatus, tangibly embodying a program of instructions executable with the apparatus for performing operations, the operations comprising: determining, with a user equipment, to use a measurement and reporting configuration based, at least partially, upon a network energy saving state of a target cell; measuring, with the user equipment, with use of the measurement and reporting configuration; and determining, with the user equipment, to transmit a measurement report based upon the determined measurement and reporting configuration.

Figure 6:
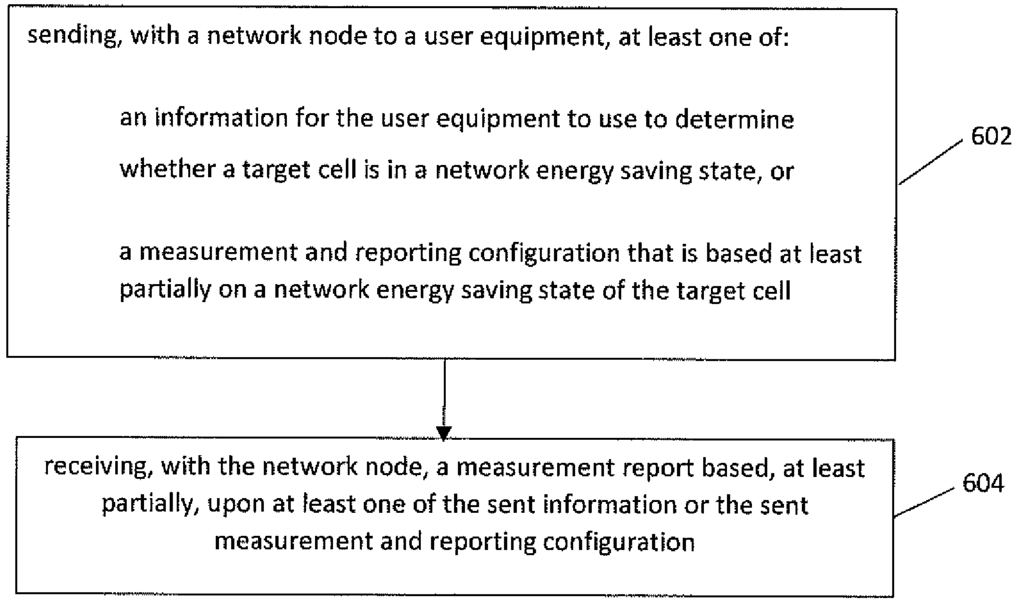
FIG. 6 is a diagram illustrating an example method.

Referring also to FIG. 6, in accordance with an example embodiment, an example method may be provided comprising: as indicated with 602 sending, with a network node to a user equipment, at least one of: an information for the user equipment to use to determine whether a target cell is in a network energy saving state, or a measurement and reporting configuration that is based at least partially on a network energy saving state of the target cell; and receiving, with the network node, a measurement report based, at least partially, upon at least one of the sent information or the sent measurement and reporting configuration as indicated with 604.

The information may be configured for the user equipment to use for identifying at least one of: one or more target cells in the network energy saving state, or one or more target cells potentially switching to the network energy saving state. The information may comprise information for the user equipment to use to estimate whether the target cell is in the network energy saving state. The information may include instructions for determining whether the target cell is in a network energy saving state. The sending may comprise sending at least two different sets of the measurement and reporting configurations. The at least two different sets of measurement and reporting configurations may comprise: a first set of measurement and reporting configuration configured to be used by the user equipment for a target cell which is not in the network energy saving state, and a second set of measurement and reporting configuration configured to be used by the user equipment for a target cell that is in the network energy saving state. The information may comprise at least one of: a list of physical cell identity and frequencies of cells and layers in network energy saving state, an indication of when a network energy saving state change will happen, or an instruction or information for the user equipment to prioritize measuring and/or reporting of cells which are not in a network energy saving state. The at least two different sets of measurement and reporting configurations may comprise at least one of: different RSRP or RSRQ measurement triggers for different network energy saving states, reporting event thresholds or hysteresis for different network energy saving states, or different measurement and reporting conditions for different network energy saving cell states.

In accordance with an example embodiment, an apparatus may be provided comprising: at least one processor; and at least one non-transitory memory storing instructions that, when executed with the at least one processor, cause the apparatus to perform: sending, with the apparatus to a user equipment, at least one of: an information for the user equipment to use to determine whether a target cell is in a network energy saving state, or a measurement and reporting configuration that is based at least partially on a network energy saving state of the target cell; and receiving, with the apparatus, a measurement report based, at least partially, upon at least one of the sent information or the sent measurement and reporting configuration.

The information may be configured for the user equipment to use for identifying at least one of: one or more target cells in the network energy saving state, or one or more target cells potentially switching to the network energy saving state. The information may comprise information for the user equipment to use to estimate whether the target cell is in the network energy saving state. The information may include instructions for determining whether the target cell is in a network energy saving state. The sending may comprise sending at least two different sets of the measurement and reporting configurations. The at least two different sets of measurement and reporting configurations may comprise: a first set of measurement and reporting configuration configured to be used by the user equipment for a target cell which is not in the network energy saving state, and a second set of measurement and reporting configuration configured to be used by the user equipment for a target cell that is in the network energy saving state. The information may comprise at least one of: a list of physical cell identity and frequencies of cells and layers in network energy saving state, an indication of when a network energy saving state change will happen, or an instruction or information for the user equipment to prioritize measuring and/or reporting of cells which are not in a network energy saving state. The at least two different sets of measurement and reporting configurations may comprise at least one of: different RSRP or RSRQ measurement triggers for different network energy saving states, reporting event thresholds or hysteresis for different network energy saving states, or different measurement and reporting conditions for different network energy saving cell states.

In accordance with an example embodiment, an apparatus may be provided comprising: means for sending, with the apparatus to a user equipment, at least one of: an information for the user equipment to use to determine whether a target cell is in a network energy saving state, or a measurement and reporting configuration that is based at least partially on a network energy saving state of the target cell; and means for receiving, with the apparatus, a measurement report based, at least partially, upon at least one of the sent information or the sent measurement and reporting configuration.

In accordance with an example embodiment, an apparatus may be provided comprising: circuitry configured for sending, with the apparatus to a user equipment, at least one of: an information for the user equipment to use to determine whether a target cell is in a network energy saving state, or a measurement and reporting configuration that is based at least partially on a network energy saving state of the target cell; and circuitry configured for receiving, with the apparatus, a measurement report based, at least partially, upon at least one of the sent information or the sent measurement and reporting configuration.

In accordance with an example embodiment, an apparatus may be provided comprising a non-transitory program storage device readable by an apparatus, tangibly embodying a program of instructions executable with the apparatus for performing operations, the operations comprising: sending, with a network node to a user equipment, at least one of: an information for the user equipment to use to determine whether a target cell is in a network energy saving state, or a measurement and reporting configuration that is based at least partially on a network energy saving state of the target cell; and receiving, with the network node, a measurement report based, at least partially, upon at least one of the sent information or the sent measurement and reporting configuration.

Some further examples are listed herein: Example 1. A method comprising: determining, with a user equipment, to use a measurement and reporting configuration based, at least partially, upon a network energy saving state of a target cell; measuring, with the user equipment, with use of the measurement and reporting configuration; and determining, with the user equipment, to transmit a measurement report based upon the determined measurement and reporting configuration.

Example 2. The method of Example 1 further comprising: receiving, with the user equipment, at least two different sets of measurement and reporting configurations; and wherein the determining to use the measurement and reporting configuration comprises selecting, with the user equipment, one of the at least two different sets of measurement and reporting configurations.

Example 3. The method of Example 2 where the at least two different sets of measurement and reporting configurations comprise: a first set of measurement and reporting configuration configured to be used by the user equipment for a target cell which is not in the network energy saving state, and a second set of measurement and reporting configuration configured to be used by the user equipment for a target cell that is in the network energy saving state.

Example 4. The method of any one of Examples 1-3 further comprising receiving, with the user equipment, at least one of: an indication regarding how to determine when the target cell is in the network energy saving state, an indication of at least one target cell being in the network energy saving state, or an indication of one or more target cells potentially switching to the network energy saving state.

Example 5. The method of Example 4 where the indication comprises at least one of: a list of physical cell identity and frequencies of cells and layers in network energy saving state, an indication of when a network energy saving state change will happen, or an instruction or information for the user equipment to prioritize measuring and/or reporting of cells which are not in a network energy saving state.

Example 6. The method of any one of Examples 1-5 further comprising determining, with the user equipment, whether the target cell is in the network energy saving state.

Example 7. The method of Example 6 where the determining whether the target cell is in the network energy saving state comprises implicitly determining the network energy saving state based upon at least one of: determining the target cell is using a different reference signal type as compared to a cell which is not in a network energy saving state, determining the target cell is using a longer reference signal periodicity as compared to a cell which is not in a network energy saving state, an indication received from a serving cell based upon reference signal periodicity, determining the target cell is using a longer reference signal periodicity for a subset of synchronization signal block beams as compared to a legacy cell, or determining the target cell is transmitting only a subset of synchronization signal block beams as compared to a legacy cell.

Example 8. The method of Example 4 where the determining of the measurement and reporting configuration comprises determining whether the target cell is indicated with the received indication.

Example 9. The method of Example 4 where the determining whether the target cell is in the network energy saving state comprises one of: use of the received indication of the at least one target cell being in the network energy saving state, or use of the received indication regarding how to determine when the target cell is in the network energy saving state.

Example 10. The method of Example 4 where the determining of the network energy saving state of the target cell is explicitly indicated in dedicated RRC signaling or a MAC control element or system information.

Example 11. The method of Example 10 where the determining of the network energy saving state of the target cell is explicitly indicated based on content of the SSB which includes information related to the network energy saving state.

Example 12. The method of any one of Examples 1-11 where the method further comprises transmitting the measurement report including sending information regarding an estimated network energy saving state of the target cell.

Example 13. The method of Example 6 further comprising setting, with the user equipment, a timer limit, from the determining of whether the target cell is in the network energy saving state, to repeat the determining of whether the target cell is in the network energy saving state.

Example 14. The method of any one of Examples 1-13 further comprising prioritizing, with the user equipment, wherein the prioritizing comprises at least one of: measuring regarding a target cell which is not in a network energy saving state before measuring regarding a target cell which is in a network energy saving state, reporting regarding a target cell which is not in a network energy saving state before reporting regarding a target cell which is in a network energy saving state, or preventing the measuring and reporting based upon determining that another cell is not in the network energy saving state.

Example 15. The method of Example 14 further comprising receiving, with the user equipment, prioritization information, where the prioritization information is configured to be used by the user equipment to performing measurement and/or report.

Example 16. The method of Example 2 where at least one of the at least two different sets of measurement and reporting configurations comprises at least one of different RSRP or RSRQ measurement triggers for different network energy saving states, reporting event thresholds or hysteresis for different network energy saving states, or different measurement and reporting conditions for different network energy saving cell states.

Example 17. The method of Example 2 where at least two of the at least two different sets of measurement and reporting configurations comprise different reference signals.

Example 18. A method comprising: sending, with a network node to a user equipment, at least one of: an information for the user equipment to use to determine whether a target cell is in a network energy saving state, or a measurement and reporting configuration that is based at least partially on a network energy saving state of the target cell; and receiving, with the network node, a measurement report based, at least partially, upon at least one of the sent information or the sent measurement and reporting configuration.

Example 19. The method of Example 18 where the information is configured for the user equipment to use for identifying at least one of: one or more target cells in the network energy saving state, or one or more target cells potentially switching to the network energy saving state.

Example 20. The method of Example 18 where the information comprises information for the user equipment to use to estimate whether the target cell is in the network energy saving state.

Example 21. The method of Example 20 where the information includes instructions for determining whether the target cell is in a network energy saving state.

Example 22. The method of Example 18 where the sending comprises sending at least two different sets of the measurement and reporting configurations.

Example 23. The method of Example 22 where the at least two different sets of measurement and reporting configurations comprise: a first set of measurement and reporting configuration configured to be used by the user equipment for a target cell which is not in the network energy saving state, and a second set of measurement and reporting configuration configured to be used by the user equipment for a target cell that is in the network energy saving state.

Example 24. The method of Example 18 where the information comprises at least one of: a list of physical cell identity and frequencies of cells and layers in network energy saving state, an indication of when a network energy saving state change will happen, or an instruction or information for the user equipment to prioritize measuring and/or reporting of cells which are not in a network energy saving state.

Example 25. The method of Example 23 where the at least two different sets of measurement and reporting configurations comprise at least one of: different RSRP or RSRQ measurement triggers for different network energy saving states, reporting event thresholds or hysteresis for different network energy saving states, or different measurement and reporting conditions for different network energy saving cell states.

The term "non-transitory," as used herein, is a limitation of the medium itself (i.e., tangible, not a signal) as opposed to a limitation on data storage persistency (e.g., RAM vs. ROM).

As used in this application, the term "circuitry" may refer to one or more or all of the following:

(a) hardware-only circuit implementations (such as implementations in only analog and/or digital circuitry) and (b) combinations of hardware circuits and software, such as (as applicable):

(i) a combination of analog and/or digital hardware circuit (s) with software/firmware and (ii) any portions of hardware processor(s) with software (including digital signal processor(s)), software, and memory(ies) that work together to cause an apparatus, such as a mobile phone or server, to perform various functions) and (iii) hardware circuit(s) and or processor(s), such as a microprocessor(s) or a portion of a microprocessor(s), that requires software (e.g., firmware) for operation, but the software may not be present when it is not needed for operation."

This definition of circuitry applies to all uses of this term in this application, including in any claims. As a further example, as used in this application, the term circuitry also covers an implementation of merely a hardware circuit or processor (or multiple processors) or portion of a hardware circuit or processor and its (or their) accompanying software and/or firmware. The term circuitry also covers, for example and if applicable to the particular claim element, a baseband integrated circuit or processor integrated circuit for a mobile device or a similar integrated circuit in server, a cellular network device, or other computing or network device.

It should be understood that the foregoing description is only illustrative. Various alternatives and modifications can be devised by those skilled in the art. For example, features recited in the various dependent claims could be combined with each other in any suitable combination(s). In addition, features from different embodiments described above could be selectively combined into a new embodiment. Accordingly, the description is intended to embrace all such alternatives, modifications and variances which fall within the scope of the appended claims.

The invention claimed is:

1. An apparatus comprising:

at least one processor; and at least one non-transitory memory storing instructions that, when executed with the at least one processor, cause the apparatus to perform:

determining, with the apparatus, to use a measurement and reporting configuration based, at least partially, upon a network energy saving state of a target cell;

measuring, with the apparatus, with use of the measurement and reporting configuration;

determining, with the apparatus, to transmit a measurement report based upon the determined measurement and reporting configuration; and prioritizing, with the apparatus, wherein the prioritizing comprises at least one of:

measuring regarding a target cell which is not in a network energy saving state before measuring regarding a target cell which is in a network energy saving state, reporting regarding a target cell which is not in a network energy saving state before reporting regarding a target cell which is in a network energy saving state, or preventing the measuring and reporting based upon determining that another cell is not in the network energy saving state.

2. The apparatus of claim 1 where the instructions, when executed with the at least one processor, cause the apparatus to perform receiving, with the apparatus, prioritization information, where the prioritization information is configured to be used by the apparatus to performing measurement and/or report.

* * * * *